US006914093B2

(12) United States Patent
Xu

(10) Patent No.: US 6,914,093 B2
(45) Date of Patent: Jul. 5, 2005

(54) POLYAMIDEIMIDE COMPOSITION

(75) Inventor: James J. Xu, Fort Wayne, IN (US)

(73) Assignee: Phelps Dodge Industries, Inc., Ft. Wayne, IN (US)

( * ) Notice: Subject to any disclaimer, the term of this patent is extended or adjusted under 35 U.S.C. 154(b) by 102 days.

(21) Appl. No.: 09/978,326

(22) Filed: Oct. 16, 2001

(65) Prior Publication Data

US 2004/0236012 A1 Nov. 25, 2004

(51) Int. Cl.[7] .............................. C08K 3/20; C08K 5/02
(52) U.S. Cl. ....................... 524/406; 524/544; 524/545; 524/590; 524/783; 524/789; 525/127; 428/379
(58) Field of Search ................................ 524/406, 544, 524/545, 590, 783, 789; 525/127; 428/379, 364, 372, 375, 376, 378, 391, 392, 394, 395; 528/60, 65, 84, 85, 170, 195

(56) References Cited

U.S. PATENT DOCUMENTS

| 3,615,913 | A | | 10/1971 | Shaw |
| 3,937,673 | A | * | 2/1976 | Koerner et al. ............. 524/320 |
| 4,340,697 | A | | 7/1982 | Aya et al. |
| 4,342,814 | A | | 8/1982 | Usuki et al. |
| 4,350,738 | A | | 9/1982 | Saunders et al. |
| 4,377,652 | A | | 3/1983 | Ohmura et al. |
| 4,405,687 | A | | 9/1983 | Morita et al. |
| 4,426,423 | A | | 1/1984 | Intrater et al. |
| 4,476,192 | A | | 10/1984 | Imai et al. |
| 4,477,624 | A | * | 10/1984 | Waki ........................... 524/736 |
| 4,503,124 | A | | 3/1985 | Keane et al. |
| 4,563,369 | A | | 1/1986 | Lavallee |
| 4,693,936 | A | | 9/1987 | McGregor et al. |
| 4,716,079 | A | | 12/1987 | Sano et al. |
| 4,902,767 | A | * | 2/1990 | Roitman et al. ............. 528/28 |
| 4,935,302 | A | | 6/1990 | Hjortsberg et al. |
| 5,066,513 | A | | 11/1991 | Zurecki et al. |
| 5,209,987 | A | | 5/1993 | Penneck et al. |
| 5,221,707 | A | * | 6/1993 | Chihara et al. ............. 524/267 |
| 5,296,260 | A | | 3/1994 | Sawada et al. |
| 5,310,850 | A | * | 5/1994 | Chen et al. .................... 528/73 |
| 5,350,638 | A | | 9/1994 | Sawada et al. |
| 5,356,708 | A | * | 10/1994 | Matsuura et al. ........... 428/375 |
| 5,393,612 | A | | 2/1995 | Matsuura et al. |
| 5,425,992 | A | | 6/1995 | Tachikawa et al. |
| 5,443,905 | A | | 8/1995 | Sawada et al. |
| 5,514,747 | A | * | 5/1996 | Hsu et al. .................... 524/590 |
| 5,602,213 | A | * | 2/1997 | Hsu et al. .................... 525/454 |
| 5,770,673 | A | * | 6/1998 | Markusch et al. ............. 528/61 |
| 5,861,578 | A | | 1/1999 | Hake et al. |
| 5,902,681 | A | | 5/1999 | Ueoka et al. |
| 2001/0018981 | A1 | * | 9/2001 | Yin et al. ................ 174/120 R |

FOREIGN PATENT DOCUMENTS

| JP | 54-99137 | 8/1979 |
| JP | 63-81173 | 4/1988 |
| JP | 3-245417 | 11/1991 |
| JP | 05320340 A | 12/1993 |
| JP | 5-320340 | 12/1993 |
| JP | 09294652 | 5/1999 |
| WO | WO 86/03329 | 6/1986 |

OTHER PUBLICATIONS

Charrier, Jean–Michel. Polymeric Materials and Processing: Plastics, Elastomers and Composites. Hanser Publishers, NY, 1990, p 148.*
Article—*Improved Tough Wire™*, James J. Xu, Phelps Dodge Magnet Wire Company.
Article—*Dynamic Mechanical Properties of Tough Magnet Wire*, James J. Xu, Keith D. Bultemeier and Daniel E. Floryan, Phelps Dodge Magnet Wire Company.
Article—*Synthesis and characterization of a rubber incorporated polyamideimide*, Debasish Sen, Ramesh C. Bhakta, Mrinal M. Maiti, Sukumar Maiti, Makromol. Chem, 186, 1625–1630 (1985).
Brochure—Poly–Thermaleze®TW (PTZ TW), Phelps Dodge Magnet Wire Company, 1998.

* cited by examiner

Primary Examiner—James J. Seidleck
Assistant Examiner—Melanie Bissett
(74) Attorney, Agent, or Firm—Barnes & Thornburg LLP

(57) ABSTRACT

Polyamideimide coating compositions for magnet wire which exhibit solvent or varnish-induced craze resistance. The polyamideimide compositions include a compound selected from the group consisting of diacid compounds, trimellitic anhydrides, benzophenonetetracarcoxylic anhydrides and mixtures thereof, a diisocyanate compound, dihydroxyl compound, a trihydroxyl compound, a fluoropolymer, and a mineral filler.

2 Claims, No Drawings

POLYAMIDEIMIDE COMPOSITION

TECHNICAL FIELD

The present invention relates to wire coating compositions. More particularly, the present invention relates to polyamideimide coating compositions for magnet wire which exhibit craze resistance.

BACKGROUND ART AND SUMMARY

Polyamidimide and polyimide are well known for their excellent thermal and electrical properties and have accordingly been widely used for magnet wire coatings and electronic packaging applications. One of the drawbacks of these materials is craze formation. Crazes initiate and propagate with or without the introduction of solvents. As crazes propagate, cracking across film layers often occurs. In the presence of varnish, crazing on polyamideimide film forms many ring-like crazes which are perpendicular to wires or coils. Crazing can also penetrate through base coat layers and expose the underlying wires, thus, resulting in electrical failure. In the field of magnet wires, electrical surge failure is frequently encountered after a varnishing process where water-borne epoxy resin is typically applied.

The mechanism which causes crazing remains unclear. Experimental data taken over the years suggests that crazing results from residual thermal stresses which occur during the curing process as a result of solvent evaporation, the extent of imidization, and the differences in the thermal expansion coefficients of the polyamideimide and the polyester base coats. As coating thicknesses increase, stress caused by thermal expansion increases and is amplified by rapid curing cycles that are commonly used in the fabrication of magnet wire.

On the molecular level, thermal stress is the result of the freezing of over-stretched polyamideimide chains, imperfect morphology, irregularly distributed density, and possibly gel particulates. Governed by the entropy of the system, in the presence of varnish, the over-stretched polyamideimide chains tend to recoil, resulting in shrinkage and, thus, craze formation on a macrometric scale.

Solvent or varnish-induced craze resistant polyamideimide enamel for magnet wire has become increasingly important since most modern winding processes tend to eliminate additional stress relief devices. The following U.S. patents exemplify various attempts to minimize crazing effects in wire coatings: U.S. Pat. No. 5,443,914 to Hart, et al., U.S. Pat. No. 5,567,781 to Martino, et al., U.S. Pat. No. 4,839,444 to Lavallee, and U.S. Pat. No. 4,181,686 to Vassiliou.

According to other features, characteristics, embodiments and alternatives of the present invention, which will become apparent as the description thereof proceeds below, an illustrative embodiment of the present invention provides a craze resistant wire coating composition for magnet wires which includes:

(a) a compound selected from the group consisting of diacid compounds, trimellitic anhydrides, benzophenonetetracarcoxylic anhydrides and mixtures thereof;

(b) a diisocyanate compound;

(c) a dihydroxyl compound;

(d) a trihydroxyl compound;

(e) a fluoropolymer; and (f) a mineral filler.

The present invention further provides a magnet wire which comprises:

a conductive element; and a layer of a craze resistant wire coating composition on the conductive element that comprises:

(a) a compound selected from the group consisting of diacid compounds, trimellitic anhydrides, benzophenonetetracarcoxylic anhydrides and mixtures thereof;

(b) a diisocyanate compound;

(c) a dihydroxyl compound;

(d) a trihydroxyl compound;

(e) a fluoropolymer; and (f) a mineral filler.

DETAILED DESCRIPTION

In the study of degradation of electrically stressed polymeric cable insulation, it is known that dentritic crazing/cracking is initiated at irregularities, such as microcavities and protrusions, at the interface of a polymeric matrix. A few large dentritic crazes are more detrimental to electrical failure than many fine dentritic crazes so that reducing the size of crazes, rather than their density, is of more interest.

The embodiment described herein is based in part on the phenomenon that a semirigid/crosslinked polyamideimide restricts chain mobility and is, thus, resistant to solvent-induced craze. In addition, the present invention is based in part on the phenomenon that a dispersed second phase minimizes the residual stress and, thus, reduces large, detrimental craze formation.

An understanding of the embodiment as disclosed herein will be aided by realizing the distinction between craze formation that occurs during room temperature storage and/or aging, and craze formation that is induced by solvents within a short period of time. Craze formation that occurs during room temperature storage and/or aging is mainly a residual thermal stress-related phenomenon. Craze formation that is induced by solvents is a combination of residual stress and penetrated solvent-induced polymer morphological changes. The polyamideimide enamels of the present invention are resistant to both types of craze formation.

The disclosure provided herein provides polyamideimide enamels that are useful in the fabrication of magnet wire and exhibit varnish craze resistance and excellent mechanical and electrical properties.

The polyamideimide enamel compositions of this embodiment are based upon a number of concepts which restrict chain mobility and shrinkage and, thus, suppress craze. One of these concepts is defining an optimal ratio of imide to amide. Another concept is introducing a crosslinking mechanism into the polyamideimide compositions. A further concept is to chemically release local stress of films formed from the polyamideimide compositions by introducing fine particulates therein. An additional concept is deferring solution of varnish penetrating into films formed from the polyamideimide compositions.

It has been determined that increasing molecular weight has little influence on suppressing varnish-induced crazing in polyamideimide film. It has been concluded, however, that craze resistance is associated with curing and cross-linking, the ratio of imide to amide, as well as a dispersed secondary phase and surface tension of the film coatings.

The polyamideimide compositions of the present disclosure comprise the following components:

(a) A diacid compound, a trimellitic anhydride (TMA) or benzophenonetetracarcoxylic anhydride (BTDA);

(b) A diisocyanate compound;

(c) A dihydroxyl compound;

(d) A trihydroxyl compound;

(e) A fluoropolymer; and (f) A mineral filler.

Examples of diacid compounds include p-, o-, and m-phthalic acid (p-PA, o-PA, IPA), 4,4'-oxy-bisbenzoic acid (OBBA), poly(acrylonitrile-co-butadiene) dicarboxy terminated (DCPAB), and adipic acid (AA). The diacid is preferably used together with trimellitic anhydride.

Examples of diisocyanate compounds include 4,4'-diphenylmethane diisocyanate (MDI) and aliphatic diisocyanate.

Examples of dihydroxyl compounds include diphenylsilanediol (DPSD).

Examples of trihydroxyl compounds include tris(2-hydroxyethyl)cyanurate (THEIC), cyanuric acid, and melamine derivatives.

The fluoropolymer is preferably polytetrafluoroethylene (PTFE) powder. The particulate PTFE is desirably treated with electron beam so that the corresponding melting point is approximately 324° C. The particle size distribution of the particulate PTFE is preferably from 0.1 to 10 microns.

Examples of mineral fillers include Mollybium dioxide ($MoS_2$), titanium dioxode ($TiO_2$), and fumed silica dioxide ($SiO_2$). These mineral fillers are added in an amount of about 0.3–10%.

The polyamideimide enamel formulations of the present invention are prepared as follows:

A diacid compound, a trimellitic anhydride (TMA) or benzophenonetetracarcoxylic anhydride (BTDA) (component a) is reacted with a diisocyanate compound (component b) in a mixture of an aprotic solvent and an aromatic diluent. The reaction is carried out in a temperature range of about 70° C.–160° C. for about 2–6 hours. The diisocyanate is stoichometrically equivalent to the sum of the mixture of the diacid and trimellitic anhydride (TMA). The end of the reaction can be monitored by the disappearance of diisocyanate groups using Fourier Transform Infrared FTIR spectroscopy The resultant reaction mixture was blended with either:

the dihydroxyl compound (component c); or the trihydroxyl compound (component d);

in a temperature range of about 30° C.–80° C.

The resultant reaction mixture was further blended with the fluoropolymer (component e) and/or the mineral filler (component f).

The resultant reaction mixture was found to have a stable formulation with a solids content of about 27–33 weight percent. The viscosity of the resultant reaction mixture was in the range of about 1700 cps to about 5000 cps measured by a Brookfield viscometer at 38° C.

In the above process, the mole ratio of component (b) to components (a) and (c) is about 1.005–1.0 to 1.0. The mole ratio of the aromatic diacid to the aliphatic acid is about 1–4 to 1.0. The mole ratio of the TMA to the aliphatic diacid is about 0.90–1.0 to 0–0.10. The mole ratio of the TMA to the aromatic diacid is about 0.8–1.0 to 0–0.20. The mole ratio of the TMA to the BDTA is about 0.9–1.0 to 0–0.10. The weight ratio of the reaction mixture of components (a)–(c) to component (d) is about 1700 grams to about 5–10 grams. The weight ratio of the reaction mixture of components (a)–(d) to component (e) is about 0.5–10% based on solids. The weight ratio of the reaction mixture of component (a)–(e) to component (f) is about 0.3–5% based solids. The preferred weight ratio of the reaction mixture of components (a)–(d) to components (e) and (f) is less than about 10% by weight based on solids.

One embodiment of a polyamideimide according to the present invention is composed of 1.005–1.0 mole of MDI, 0.8–1.0 mole of TMA, 0.2–0.02 mole of aromatic diacid, and 0.03–0.10 mole of aliphatic diacid.

The following examples are presented to illustrate, but not limit, the invention as obvious variations thereon will become obvious to those skilled in the art. In the examples and throughout, percentages are by weight, unless otherwise indicated.

In the following examples, craze was determined by the following procedure. Wire samples either coated or over-coated with the polyamideimide enamel compositions were elongated 5±1% in air. The resulting wire samples were wound into coils on a ½ inch mandrel. The coiled samples were dipped in varnish and air dried at room temperature. The varnish-dipped, coiled samples were baked for 10±1 minutes at 150±5° C. and cooled for at least 10 minutes at room temperature. After cooling, the coils were examined for crazing at 20× magnification. Crazing was rated or categorized as follow:

"None"=No observable crazing;

"Negligible" or "Negl."=Crazing that was difficult to see;

"Fine"=Crazing that was easily observed;

"Few"=Three or less crazes that extend around the circumference of the wire;

"Many"=More than three crazes that extend around the circumference of the wire.

A rating of "none" or "negl" is considered acceptable, while the remaining ratings are considered failures.

EXAMPLE 1

In this example, a control polyamideimide composition was prepared according to the following procedure. 1 mole of diphenylmethane 4,4-diisocyanate (MDI), 0.70 mole of trimetallic anhydride (TMA), and 0.30 mole of Adipic Acid (AA), were added into a mixed solvent of n-methyl pyrolidone (NMP) and aromatic hydrocarbons mixture ($C_9$–$C_{16}$). Trace amounts of versar wax and aliphatic diisocyanate were also charged to make stoichiometric balance of the system. The reaction was carried out at 70° C.–90° C. and then 120° C.–150° C. until all diisocyanate groups disappeared as determined by FTIR. The reaction was then stopped with alcohol, n-methyl pyrolidone (NMP), and aromatic hydrocarbons mixture ($C_9$–$C_{16}$). The typical solids and viscosity of the control polyamideimide is 28%–30%, 1800–2000 cps at 38° C., respectively.

A wire sample was prepared and tested according to the procedure mentioned above. Properties of the wire sample are shown in Table 1 below.

EXAMPLE 2

In this Example, a semirigid polyamideimide composition was prepared according to the following procedure. 1 mole of MDI, 0.87 mole of TMA, 0.05 mole of AA, 0.078 mole of isophthalic acid (IPA), and 0.0036 mole of dicarboxyl terminated poly(acrylonitrile-co-butadiene) (DCPAB) were added into a mixed solvent of NMP and aromatic hydrocarbons mixture ($C_9$–$C_{16}$). Trace amounts of versar wax and aliphatic diisocyanate were also charged to make the stoichiometric balance of the system. The reaction was carried out at 70° C.–90° C. and then 120°–150° C. until all diisocyanate groups disappeared as determined by the FTIR. The reaction was then stopped with alcohol, NMP, and aromatic hydrocarbons mixture ($C_9$–$C_{16}$). A PTFE slurry was added into reaction mixture which was approximately 1% of total enamel solution.

EXAMPLE 3

1 mole of MDI, 0.95 mole of TMA, 0.05 mole of AA, and 0.002 mole of DCPAB were added into a mixed solvent of NMP and aromatic hydrocarbons mixture ($C_9$–$C_{16}$). Trace amounts of versar wax and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 4

1 mole of MDI, 0.95 mole of TMA, 0.05 mole of diphenylsilosanediol, and 0.002 mole of DCPAB were added into a mixed solvent of NMP and aromatic hydrocarbons mixture ($C_9$–$C_{16}$). Trace amounts of versar wax and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 5

1 mole of MDI, 0.975 mole of TMA, and 0.025 mole of diphenylsilosanediol were added into a mixed solvent of NMP and aromatic hydrocarbons mixture ($C_9$–$C_{16}$). Trace amounts of versar wax and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 6

1 mole of MDI, 0.98 mole of TMA, and 0.02 mole of vinyl-terminated silicone oil were added into a mixed solvent of NMP and aromatic hydrocarbons mixture ($C_9$–$C_{16}$). Trace amounts of versar wax and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 7

1 mole of MDI, 0.95 mole of TMA, 0.002 mole of DCPAB and 0.02 mole of benzophenonetetracarboxylic anhydride (BTDA) were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 8

1 mole of MDI, 0.90 mole of TMA, 0.037 mole of IPA, 0.03 mole of AA, 0.03 mole of BTDA, and 0.003 mole of DCPAB were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 9

1 mole of MDI, 0.90 mole of TMA, 0.07 mole of IPA, and 0.03 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 10

1 mole of MDI, 0.80 mole of TMA, 0.15 mole of IPA, and 0.05 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 11

1 mole of MDI and 1 mole of TMA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution. Approximately 0.3% (wt %) $MoS_2$ was added into enamel system.

A wire sample was prepared and tested according to the procedure mentioned above. Properties of the wire sample are shown in Table 1 below.

EXAMPLE 12

1 mole of MDI, 0.95 mole of TMA, and 0.05 mole of AA of were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 13

1 mole of MDI, 0.95 mole of TMA, 0.07 mole of IPA, and 0.03 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 14

1 mole of MDI, 0.95 mole of TMA, 0.025 mole of IPA, and 0.025 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 15

1 mole of MDI, 0.95 mole of TMA, and 0.05 mole of 4,4"-oxy-bisbenzoic acid (OBBA) were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 16

1 mole of MDI, 0.85 mole of TMA, 0.05 mole of OBBA, 0.05 mole of IPA, and 0.05 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

and aromatic hydrocarbons mixture ($C_9$–$C_{16}$). Trace amounts of aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution. About 0.15 mole of THEIC, dissolved in NMP, was charged into the reaction at about 80° C.

A wire sample was prepared and tested according to the procedure mentioned above. Properties of the wire sample are shown in Table 1 below.

TABLE 1

| Example No. | 1 | 3 | 4 | 5 | 6 | 7 | 8 | 9 | 10 |
|---|---|---|---|---|---|---|---|---|---|
| Solids (%) | 28.0 | 33.8 | 29.8 | 32.9 | 32.8 | 28.5 | 34.8 | 31.8 | 32.9 |
| Viscosity (cps) | 1800 | 5000 | 2300 | 5000 | 4150 | 1925 | 2900 | 2835 | 3750 |
| Curing speed/crazing | | | | | | | | | |
| 32 m/m | yes | none | none | none | none | none | negl | none | none |
| 34 m/m | yes | none | none | none | none | none | fine | none | negl |
| 36 m/m | yes | none | none | none | none | none | fine | fine | fine |
| Mandrel Flex (1 × 35%) | pass | pass | pass | pass | pass | pass | pass | pass | pass |

| Example No. | 11 | 12 | 13 | 14 | 15 | 16 | 17 | 18 |
|---|---|---|---|---|---|---|---|---|
| Solids (%) | 32.6 | 33.8 | 29.5 | 27.1 | 27.4 | 28.3 | 28.0 | 30.0 |
| Viscosity (cps) | 3600 | 3500 | 2950 | 3050 | 1850 | 2500 | 2400 | 3100 |
| Curing speed/crazing | | | | | | | | |
| 32 m/m | none | negl | negl | none | none | none | negl | negl |
| 34 m/m | none | negl | none | none | negl | none | none | negl |
| 36 m/m | negl | negl | negl | negl | negl | none | negl | negl |
| Mandrel Flex (1 × 35%) | pass | pass | pass | pass | pass | pass | pass | negl |

EXAMPLE 17

1 mole of MDI, 0.90 mole of TMA, 0.02 mole of OBBA, 0.05 mole of IPA, and 0.03 mole of AA were added into a mixed solvent of NMP and aromatic hydrocarbons mixture ($C_9$–$C_{16}$). Trace amounts of vinyl-terminated silicone oil, versar wax, and aliphatic diisocyanate were also charged to make the stoichiometric balance of the system. The reaction was carried out at 70–90° C. and then 120–150° C. until all diisocyanate groups disappeared as determined by FTIR. The reaction was then stopped with alcohol, NMP, and aromatic hydrocarbons mixture ($C_9$–$C_{16}$). A PTFE slurry was added into reaction mixture which was approximately 1% of total enamel solution.

A wire sample was prepared and tested according to the procedure mentioned above. Properties of the wire sample are shown in Table 1 below.

EXAMPLE 18

1 mole of MDI, 0.75 mole of TMA, 0.15 mole of IPA, and 0.10 mole of p-TA were added into a mixed solvent of NMP Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed is:

1. A craze resistant wire coating composition for magnet wires comprising:
    a solution of a polyamideimide polymer formed by the reaction of a diisocyanate with a reactant mixture comprising trimellitic anhydride, at least one diacid, and diphenylsilanediol in an organic solvent; and
    dispersed in said polymer solution, a particulate component selected from the group consisting of a fluoropolymer and a mineral filler.

2. A magnet wire comprising a conductor element and a coating of the composition of claim 1.

* * * * *